(12) United States Patent
Miwa

(10) Patent No.: US 9,766,885 B2
(45) Date of Patent: Sep. 19, 2017

(54) SYSTEM, METHOD, AND STORAGE MEDIUM

(71) Applicant: FUJITSU LIMITED, Kawasaki-shi, Kanagawa (JP)

(72) Inventor: Masahiro Miwa, Kawaguchi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/083,672

(22) Filed: Mar. 29, 2016

(65) Prior Publication Data

US 2016/0335083 A1   Nov. 17, 2016

(30) Foreign Application Priority Data

May 13, 2015  (JP) ................................. 2015-098201

(51) Int. Cl.
  *G06F 9/30* (2006.01)
  *G06F 15/173* (2006.01)

(52) U.S. Cl.
  CPC ...... *G06F 9/3001* (2013.01); *G06F 15/17318* (2013.01); *G06F 15/17331* (2013.01)

(58) Field of Classification Search
  None
  See application file for complete search history.

(56) References Cited

U.S. PATENT DOCUMENTS

| 9,003,413 B1* | 4/2015 | Anderson ........... H04L 12/2634 |
| | | 718/102 |
| 2014/0007111 A1* | 1/2014 | Targowski .............. G06F 9/522 |
| | | 718/102 |
| 2014/0115603 A1 | 4/2014 | Yu et al. |
| 2015/0309845 A1* | 10/2015 | Wilson .................... G06F 9/522 |
| | | 718/106 |

FOREIGN PATENT DOCUMENTS

| JP | 2006-268092 | 10/2006 |
| JP | 2014-531081 | 11/2014 |

* cited by examiner

*Primary Examiner* — Syed Roni
(74) *Attorney, Agent, or Firm* — Staas & Halsey LLP

(57) ABSTRACT

A system includes a plurality of arithmetic devices configured to execute arithmetic processes in parallel. Each of plurality of arithmetic devices is configured to: determine whether a time period from the start of collective communication to reception from another arithmetic device involved in the collective communication is equal to or shorter than a predetermined threshold, determine a target arithmetic device that is among the plurality of arithmetic devices and for which a waiting scheme involved in the collective communication is to be changed when the time period is determined to be equal to or shorter than the predetermined threshold, and transmit, to the target arithmetic device, an instruction to change the waiting scheme involved in the collective communication.

15 Claims, 14 Drawing Sheets

PASSAGE OF TIME

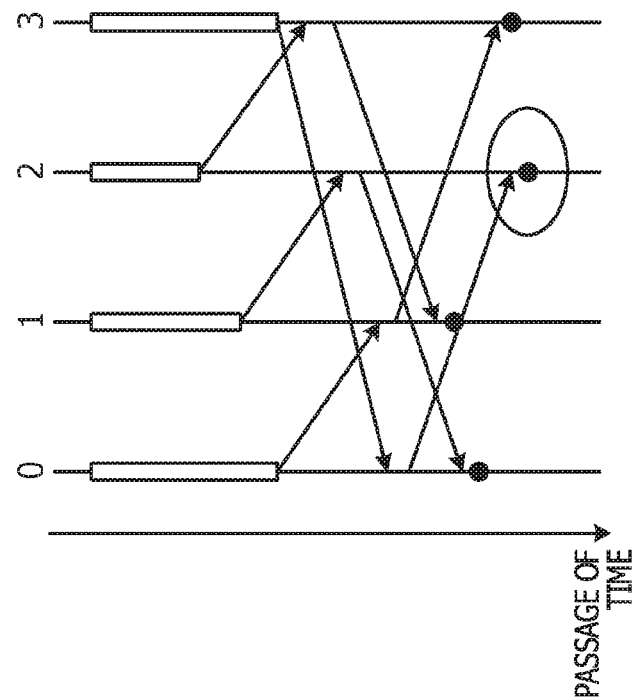
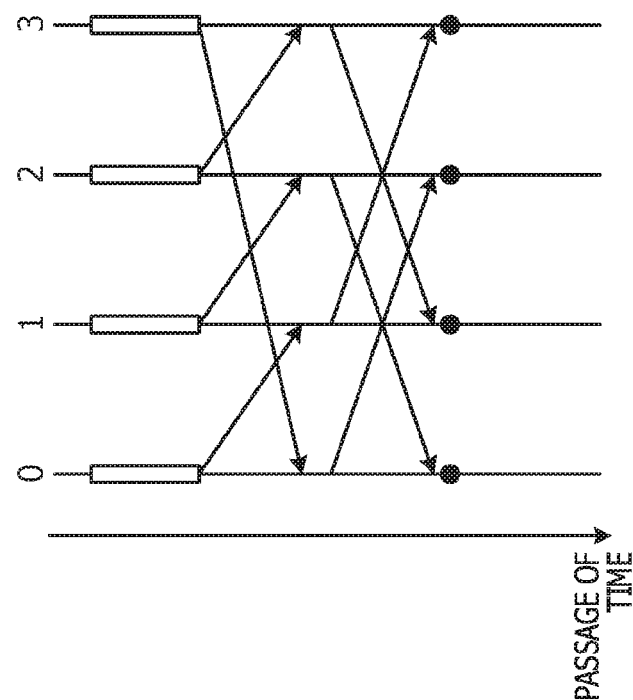
FIG. 14A RELATED ART — CASE WHERE NOISE DOES NOT EXIST
FIG. 14B — CASE WHERE NOISE EXISTS
□ ... INDICATES ARITHMETIC PROCESS (OTHER THAN COMMUNICATION)
● ... INDICATES COMPLETION

US 9,766,885 B2

SYSTEM, METHOD, AND STORAGE MEDIUM

CROSS-REFERENCE TO RELATED APPLICATION

This application is based upon and claims the benefit of priority of the prior Japanese Patent Application No. 2015-098201, filed on May 13, 2015, the entire contents of which are incorporated herein by reference.

FIELD

The embodiment discussed herein is related to a system, a method, and a storage medium.

BACKGROUND

In a parallel computing system, Message Passing Interface (MPI) is used for communication between processes. The communication using MPI includes one-to-one communication to be executed between two processes, collective communication in which two or more processes are involved in the same communication at the same time, and the like.

In an example of the collective communication, a Barrier operation is used. The Barrier operation is used for synchronization between processes. Processes that participate in the Barrier operation stand by until all the processes reach the Barrier operation. FIG. 13 is a diagram describing the Barrier operation. FIG. 13 illustrates a case where a dissemination algorithm is used as a communication algorithm.

As illustrated in FIG. 13, if the number of processes is 4, the Barrier operation is executed in two steps. In the step #1, each of the processes transmits, to a process with a rank number ((a rank number of the transmitting process+2^0) % the number of the processes), a reaching notification indicating that the transmitting process reached the Barrier operation. "Rank numbers" are numbers identifying the processes. In the case where the number of the processes is 4, the rank numbers are in a range of 0 to 3. A symbol "A" indicates exponentiation and "x % y" indicates a remainder of the division of x by y. In the step #2, each of the processes transmits, to a process with a rank number ((a rank number of the transmitting process+2^1) % the number of the processes), a reaching notification indicating that the transmitting process reached the Barrier operation.

For example, a process #0 receives a reaching notification from a process #3 in the step #1 and thereby recognizes that the process #3 reached the Barrier operation. The process #0 receives a reaching notification from a process #2 in the step #2 and thereby recognizes that the process #2 reached the Barrier operation. Since the process #2 receives a reaching notification from the process #1 in the step #1, the process #0 recognizes that the process #1 reached the Barrier operation. The other processes recognize that the processes reached the Barrier operation in the same manner. Since all the processes reached the Barrier operation, the Barrier operation is completed in the two steps.

As related art, the following technique is known: a technique for switching a processor core between an interruption mode and a polling mode based on a static configuration switching rule and improving a process efficiency in a process executed on a network I/O request in a multiprocessor core system.

In addition, the following technique is known: a technique for reducing a load to be applied to a CPU by controlling, by polling from a CPU for controlling image processing to a processor, a process that is executed by the processor executing the image processing and for which a time period is able to be calculated and by controlling another process by interruption from the processor to the CPU.

As examples of related art, Japanese National Publication of International Patent Application No. 2014-531081 and Japanese Laid-open Patent Publication No. 2006-268092 are known.

SUMMARY

According to an aspect of the invention, a system includes a plurality of arithmetic devices configured to execute arithmetic processes in parallel. Each of plurality of arithmetic devices is configured to: determine whether a time period from the start of collective communication to reception from another arithmetic device involved in the collective communication is equal to or shorter than a predetermined threshold, determine a target arithmetic device that is among the plurality of arithmetic devices and for which a waiting scheme involved in the collective communication is to be changed when the time period is determined to be equal to or shorter than the predetermined threshold, and transmit, to the target arithmetic device, an instruction to change the waiting scheme involved in the collective communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 14A and 14B are diagrams describing a delay of a specific process in collective communication.

DESCRIPTION OF EMBODIMENT

Figure 13:
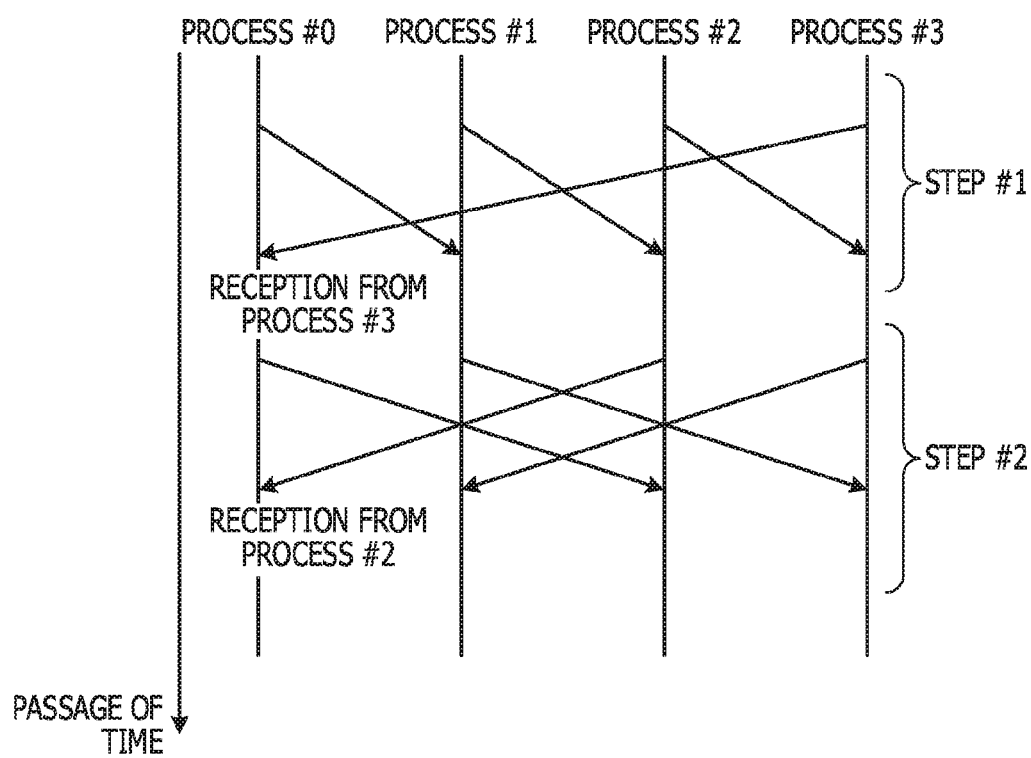
FIG. 13 is a diagram describing a Barrier operation.

It is ideal that all processes are completed at the same time in collective communication, like the Barrier operation described with reference to FIG. 13. However, the start of collective communication by a specific process may be actually delayed due to noise (a process such as interruption or a daemon process). FIGS. 14A and 14B are diagrams describing a delay of a specific process in collective communication. In FIGS. 14A and 14B, numbers 0 to 3 indicate processes with rank numbers 0 to 3.

As illustrated in FIG. 14A, the processes #0 to #3 start the collective communication at the same time and complete the collective communication at the same time in a case where noise does not exist. On the other hand, as illustrated in FIG. 14B, the processes #0 to #3 start the collective communication at different times and complete the collective communication at different times in a case where noise exists. In the case illustrated in FIG. 14B, the completion of the collective communication by the process #2 is delayed. In the collective communication, the completion of communication by a part of processes may be delayed. If the completion of communication by a part of the processes is delayed, the performance of an application using the collective communication may be reduced.

According to an aspect, an object of an embodiment is to suppress a delay of a part of processes in collective communication.

Hereinafter, the embodiment disclosed herein is described in detail with reference to the accompanying drawings. The embodiment does not limit techniques disclosed herein.

Embodiment

Figure 1:
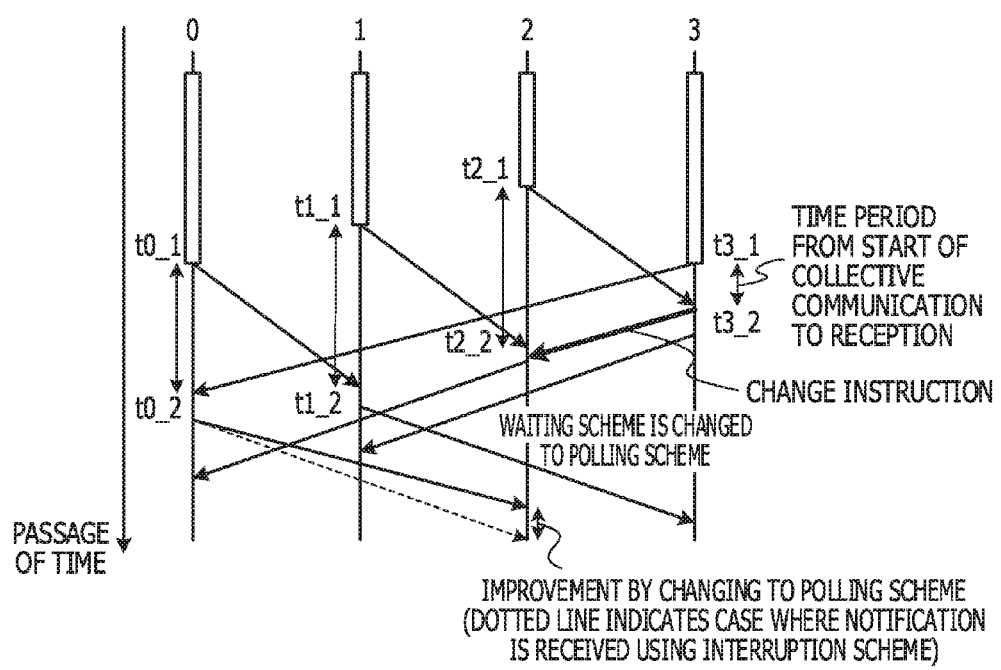
FIG. 1 is a diagram describing a change of a communication completion waiting scheme by a process according to an embodiment.

First, a change of a communication completion waiting scheme by a process according to the embodiment is described. A communication algorithm used in the embodiment is a dissemination algorithm. FIG. 1 is a diagram describing the change of the communication completion waiting scheme by the process according to the embodiment. In FIG. 1, numbers 0, 1, 2, and 3 indicate processes with rank numbers 0 to 3. In addition, t0_1, t1_1, t2_1, and t3_1 indicate times when the processes #0 to #3 start collective communication, while t0_2, t1_2, t2_2, and t3_2 indicate times when the processes #0 to #3 receive reaching notifications for the collective communication.

As illustrated in FIG. 1, a certain process for which a time period of (ti_2–ti_1) (0≤i≤3) from the time when the certain process starts the collective communication to the time when the certain process receives a reaching notification is short is delayed, compared with the other processes. In a case illustrated in FIG. 1, a time period of (t3_2–t3_1) from the time when the process #3 starts the collective communication to the time when the process #3 receives a reaching notification is short, compared with the other processes.

A destination process to which the process #3 transmits a reaching notification in a step #1 is the process #0, since (3+2^ 0) % 4=0. A destination process to which the process #0 transmits a reaching notification in a step #2 is the process #2, since (0+2^ 1) % 4=2. Thus, the completion of the collective communication by the process #2 is delayed.

If the time period of (t3_2–t3_–1) from the time when the process #3 starts the collective communication to the time when the process #3 receives the reaching notification is equal to or shorter than a predetermined threshold, the process #3 changes a communication completion waiting scheme for the process #2 from an interruption scheme to a polling scheme in order to cause the collective communication by the process #2 to be completed earlier. The predetermined threshold is based on an average value of time periods from the times when the collective communication is started to the times when the reaching notifications are received. For example, the predetermined threshold is ⅓ of the average value.

The interruption scheme is a scheme of executing interruption to a CPU upon the completion of communication by a communication device and providing a notification indicating the completion of the communication. In the interruption scheme, since control is shifted to an operating system (OS), a process delay occurs but power to be consumed is low. The polling scheme is a scheme of periodically checking the completion of communication. In the polling scheme, a process delay is shorter than that in the interruption scheme, but a CPU resource is consumed and power to be consumed is high. Normally, the interruption scheme is used in order to reduce power to be consumed.

Thus, by changing the communication completion waiting scheme from the interruption scheme to the polling scheme, the process may cause the communication to be completed earlier. In the case illustrated in FIG. 1, the time when the process #2 completes the communication becomes earlier or changes from a time pointed by a dotted arrow to a time pointed by a solid arrow.

In this manner, the process according to the embodiment may suppress a delay of a part of processes by changing, from the interruption scheme to the polling scheme, the scheme of waiting for the completion of collective communication, expected to be delayed, of a process.

Figure 2:
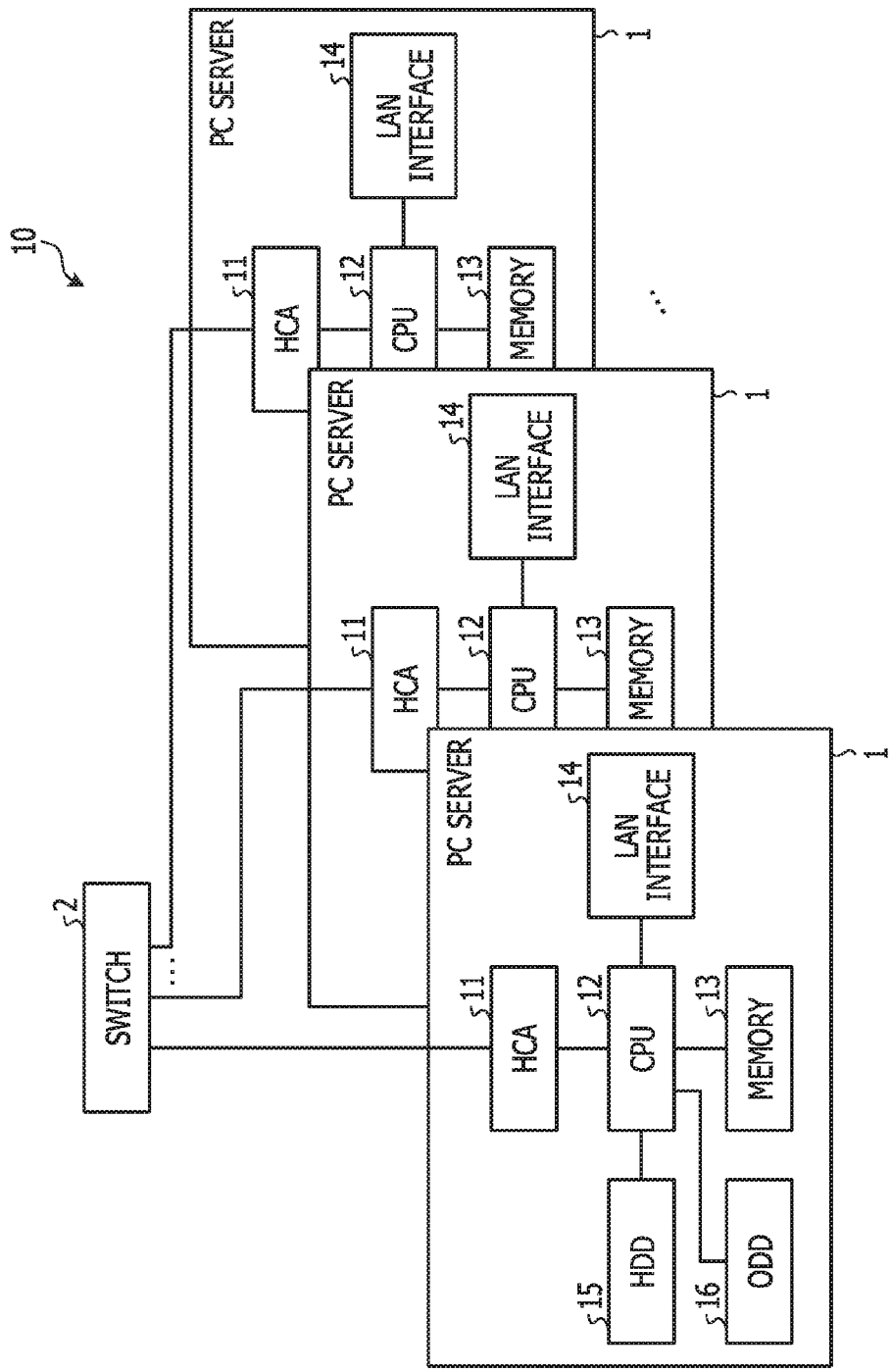
FIG. 2 illustrates a configuration of a PC cluster system according to the embodiment.

Next, a configuration of a PC cluster system according to the embodiment is described. The PC cluster system is a parallel computing system composed of multiple PC servers. FIG. 2 illustrates the configuration of the PC cluster system according to the embodiment. As illustrated in FIG. 2, the PC cluster system 10 includes the multiple PC servers 1 and a switch 2 that couples the multiple PC servers 1 to each other. InfiniBand is used for communication between the PC servers 1.

Although the single switch 2 is illustrated, the PC cluster system 10 may include multiple switches 2 that couple the PC servers 1 to each other. A scheme for the communication between the PC servers 1 may be a communication scheme other than InfiniBand.

Each of the PC servers 1 includes a host channel adapter (HCA) 11, a CPU 12, a memory 13, a local area network (LAN) interface 14, a hard disk drive (HDD) 15, and an optical disc drive (ODD) 16.

The HCA 11 is a device to be coupled to the other HCAs 11 or the switch 2. The CPU 12 is a central processing unit configured to read a program from the memory 13 and execute the program. Each of the CPUs 12 executes a respective one of multiple processes of the parallel program. The memory 13 is a random access memory (RAM) configured to store results of the execution of the program, results of the progress of the execution of the program, and the like.

The LAN interface 14 is an interface that couples the PC server 1 to the other PC servers 1 through a LAN. The HDD 15 is a disk device configured to store the program and data. The ODD 16 is a device configured to execute reading and writing from and in a DVD.

The program to be executed by the PC server 1 is stored in the DVD, read by the ODD 16 from the DVD, and installed in the PC server 1. Alternatively, the program to be executed by the PC server 1 may be stored in databases of other computer systems coupled to the PC server 1 through the LAN interface 14, read from the databases, and installed in the PC server 1. The installed program is stored in the HDD 15, read into the memory 13, and executed by the CPU 12.

Figure 3:
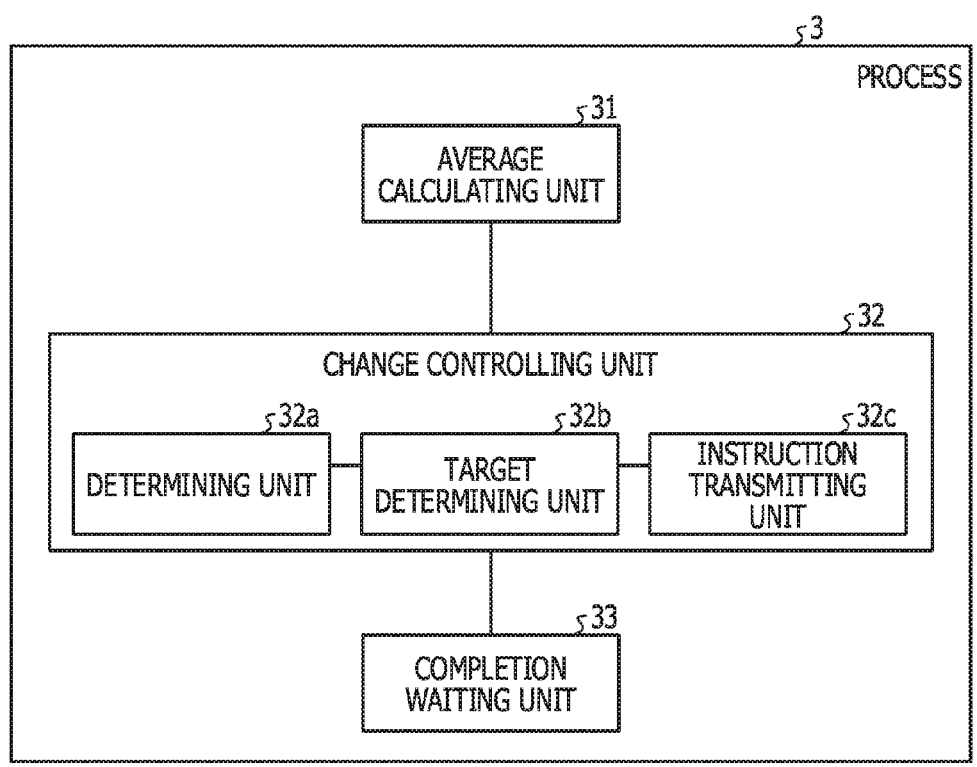
FIG. 3 illustrates a functional configuration of a process according to the embodiment.

Next, a functional configuration of the process according to the embodiment is described. FIG. 3 illustrates the functional configuration of the process according to the embodiment. As illustrated in FIG. 3, the process 3 includes an average calculating unit 31, a change controlling unit 32, and a completion waiting unit 33.

The average calculating unit 31 calculates an average value of time periods from times when collective communication is started to times when reaching notifications are received. When the parallel program is executed, the collective communication is executed multiple times. When the collective communication is initially executed, the average calculating unit 31 calculates an average value of time periods from times when the collective communication is started to times when reaching notifications are received. Then, the average calculating unit 31 causes the calculated average value to be stored in the memory 13.

The change controlling unit 32 measures the time periods from the times when the collective communication is started to the times when the reaching notifications are received. If a time period from the time when the collective communication is started to the time when a reaching notification is received is equal to or shorter than the predetermined threshold, the change controlling unit 32 changes, from the interruption scheme to the polling scheme, the scheme of waiting for the completion of collective communication, expected to be delayed, of a process.

The change controlling unit 32 includes a determining unit 32a, a target determining unit 32b, and an instruction transmitting unit 32c. The determining unit 32a measures a time period from the time when the collective communication is started to the time when a reaching notification is received. The determining unit 32a determines whether or not the measured time period is equal to or shorter than the predetermined threshold. For example, the predetermined threshold is ⅓ of the average value calculated by the average calculating unit 31. The predetermined threshold may not be ⅓ of the average value as long as the predetermined threshold is based on the average value. Alternatively, the predetermined threshold may not be based on the average value and may be based on a central value of the time periods or the like.

If the determining unit 32a determines that the measured time period is equal to or shorter than the predetermined threshold, the target determining unit 32b identifies a process that is to be changed and for which the communication completion waiting scheme is to be changed to the polling scheme. In the case illustrated in FIG. 1, the number of the processes is 4 and only the process #2 is a process to be changed. If the number of processes is large, the target determining unit 32b identifies multiple processes to be changed.

Figure 4:
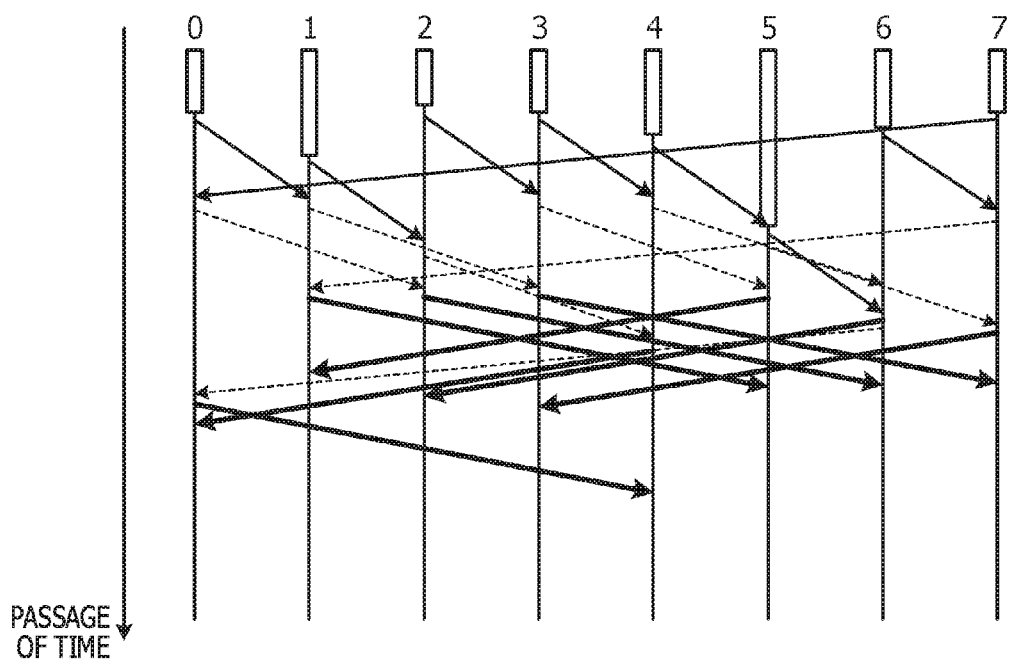
FIG. 4 is a diagram describing processes to be changed in a case where the number of processes is 8.

FIG. 4 is a diagram describing processes to be changed in a case where the number of processes is 8. In FIG. 4, numbers 0 to 7 indicate the processes that have rank numbers 0 to 7. In the case where the number of the processes is 8, the collective communication is completed in log(8)=3 steps. The base of log is 2.

In the case illustrated in FIG. 4, the completion of communication of the process #4 is delayed. The reason why the completion of the communication of the process #4 is delayed is that transmission by the process #0 is delayed in a step #3. The reason why the transmission by the process #0 is delayed is that transmission by the process #6 is delayed in a step #2. In addition, the reason why the transmission by the process #6 is delayed is that transmission by the process #5 is delayed in a step #1.

In the step #1, the process #5 identifies the process #0 in the step #2 and the process #4 in the step #3 as processes to be changed, for example. Alternatively, in the step #1, the process #5 may identify only the process #4 in the step #3 as a process to be changed.

In general, if the number of processes is n and the number of steps is log(n), the target determining unit 32b identifies, as a process to be changed, a process to be delayed in a step after an x-th (2≤x≤log(n)) step. In this case, x indicates a number determined based on an application, power to be consumed by the CPU 12, and the like. If x≤i≤log(n), the target determining unit 32b identifies a process to be delayed in an i-th step based on a rank number of ((a rank number of the process $3+2^{\wedge}$ (i−1)) % n).

Figure 5:
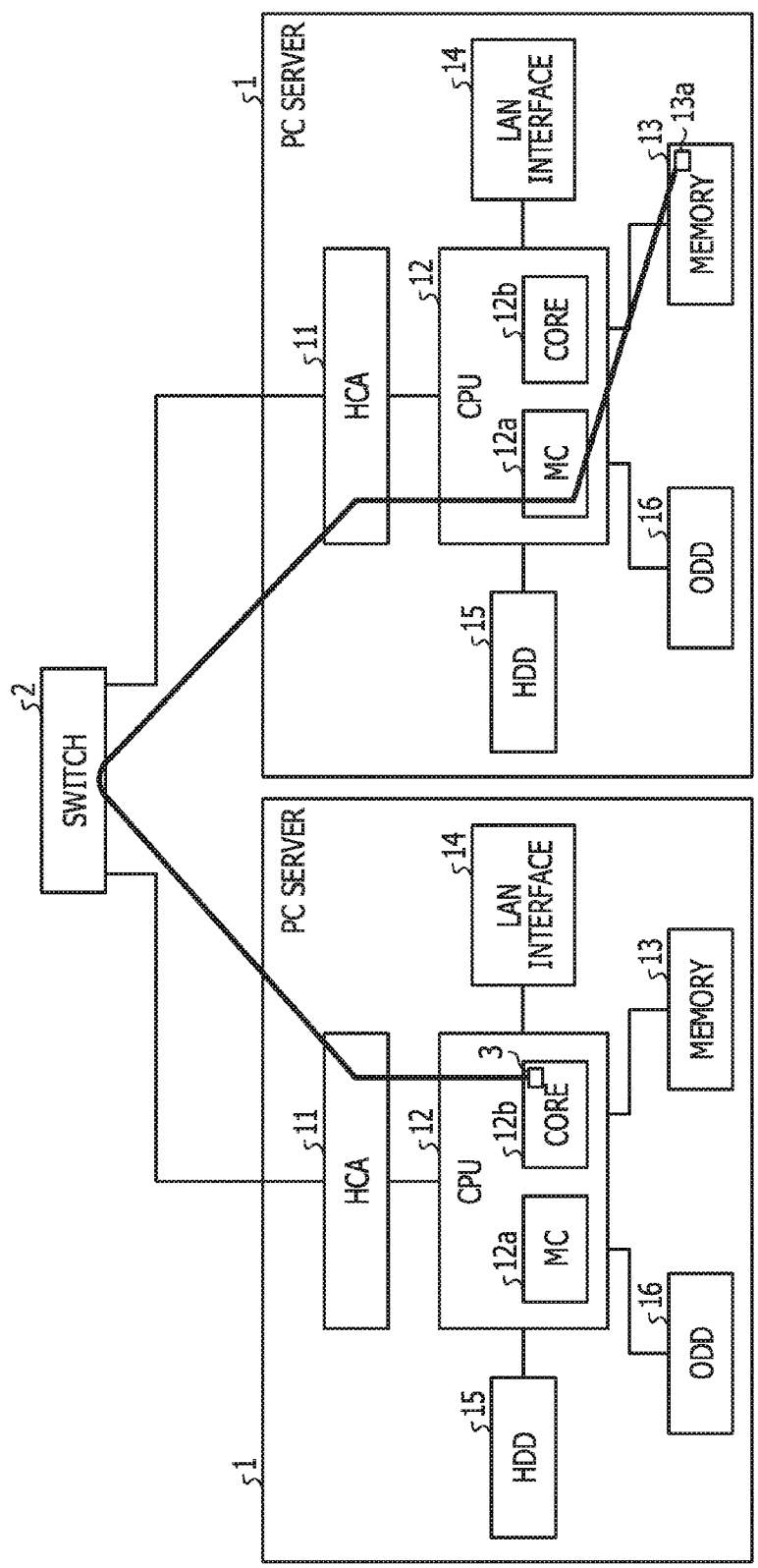
FIG. 5 is a diagram describing RDMA.

The instruction transmitting unit 32c transmits, to the process identified by the target determining unit 32b, an instruction to change the communication completion waiting scheme to the polling scheme. In this case, the instruction transmitting unit 32c transmits the change instruction by remote direct memory access (RDMA). FIG. 5 is a diagram describing RDMA.

As illustrated in FIG. 5, each of the CPUs 12 includes a memory controller (MC) 12a and a core 12b. The MC 12a is a control device provided for the core 12b to access the memory 13. The core 12b is a processing device configured to execute an arithmetic process.

The process 3 executed by the core 12b of the PC server 1 accesses a region 13a of the memory 13 of another PC server 1 to be changed through the HCA 11 of the PC server 1 on which the process 3 is executed, the switch 2, the HCA 11 of the other PC server 1 to be changed, and the MC 12a of the other PC server 1 to be changed. The PC server 1 to be changed is a PC server 1 on which the process 3 to be changed is executed.

The completion waiting unit 33 executes a process of waiting for the completion of collective communication. Specifically, if a scheme change flag is set, the completion waiting unit 33 changes the communication completion waiting scheme to the polling scheme. If the scheme change flag is not set, the completion waiting unit 33 executes the process of waiting for the completion of collective communication by the interruption scheme. The scheme change flag is set in the region 13a illustrated in FIG. 5.

Figure 6:
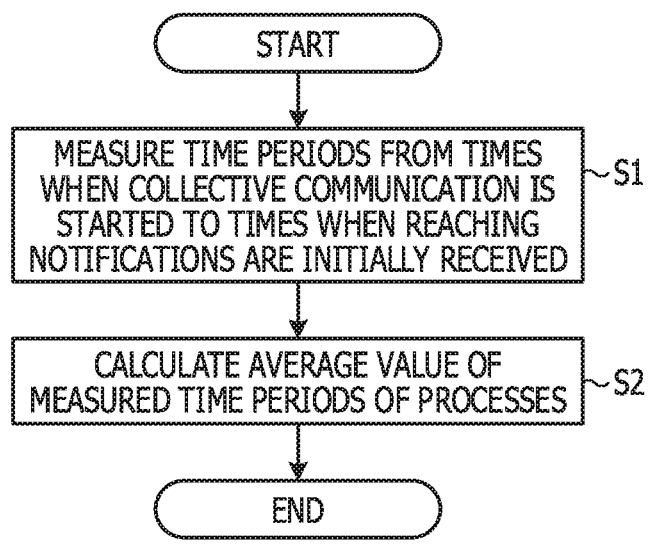
FIG. 6 is a flowchart of a process of calculating an average value.

Next, the flow of a process of calculating an average value is described. FIG. 6 is a flowchart of the process of calculating an average value. As illustrated in FIG. 6, the average calculating unit 31 measures time periods from times when the collective communication is started to times when reaching notification are initially received (in step S1). The average calculating unit 31 calculates an average value of the time periods measured for the processes (in step S2) and causes the calculated average value to be stored in the memory 13.

Since the average calculating unit 31 measures the time periods from the times when the collective communication is started to the times when the reaching notifications are initially received and the average calculating unit 31 calculates the average value of the time periods measured for the processes, the determining unit 32a may calculate the predetermined threshold to be used for the determination.

Figure 7:
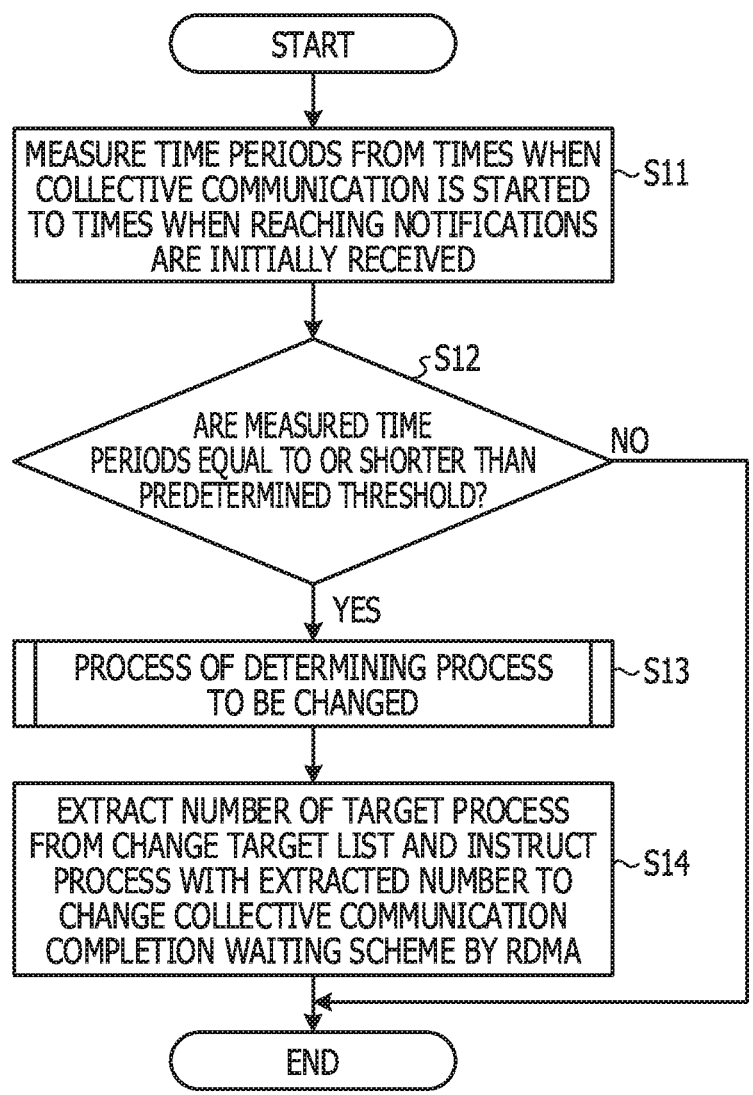
FIG. 7 is a flowchart of a change control process.

Next, the flow of a change control process of controlling a change of the scheme of waiting for the completion of the collective communication is described. FIG. 7 is a flowchart of the change control process. As illustrated in FIG. 7, the change controlling unit 32 measures time periods from times when the collective communication is started to times when reaching notifications are received (in step S11).

Then, the change controlling unit 32 determines whether or not the measured time periods are equal to or shorter than the predetermined threshold (in step S12). If the measured time periods are longer than the predetermined threshold, the process is terminated. If at least any of the measured time periods is equal to or shorter than the predetermined threshold, the change controlling unit 32 executes a process of determining a process to be changed (in step S13).

Then, the change controlling unit 32 extracts a number of the process to be changed from a change target list and instructs the process with the extracted number to change the scheme of waiting for the completion of the collective communication by RDMA (in step S14). The change target list is a list of numbers of processes to be changed.

Since the change controlling unit 32 controls a change of the scheme of waiting for the completion of the collective communication based on time periods from times when the collective communication is started to times when reaching notifications are received, a delay of a part of processes in the collective communication may be suppressed.

Figure 8:
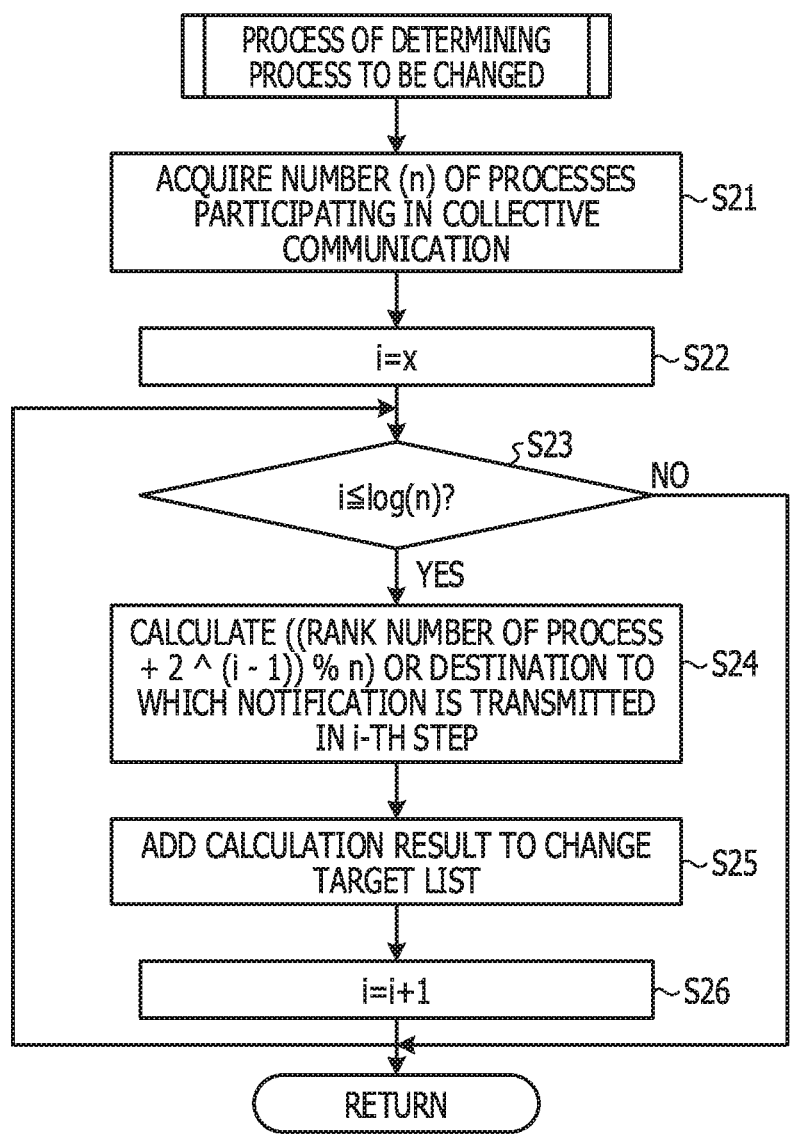
FIG. 8 is a flowchart of a process of determining a process to be changed.

Next, the flow of the process of determining a process to be changed is described. FIG. 8 is a flowchart of the process of determining a process to be changed. As illustrated in FIG. 8, the target determining unit 32b acquires a number n of processes participating in the collective communication (in step S21) and sets a value of i to x (in step S22). In this case, i is a variable storing the number of repetitions, and x indicates an initial step that is among steps of the collective communication and in which a process to be delayed is identified as a process to be changed.

Then, the target determining unit 32b determines whether or not the variable i is equal to or smaller than log(n) (in step S23). If the variable i is larger than log(n), the process is terminated. If the variable i is equal to or smaller than log(n), the target determining unit 32b calculates a formula of (((a rank number of the process 3)+2^ (i−1)) % n) or a destination to which a reaching notification is transmitted in the i-th step (in step S24). Then, the target determining unit 32b adds the result of the calculation to the change target list (in step S25), adds 1 to i (in step S26), and causes the process to return to step S23.

Since the target determining unit 32b generates the change target list in the aforementioned manner, the change controlling unit 32 may transmit an instruction to a process for which the collective communication completion waiting scheme is to be changed.

Figure 9:
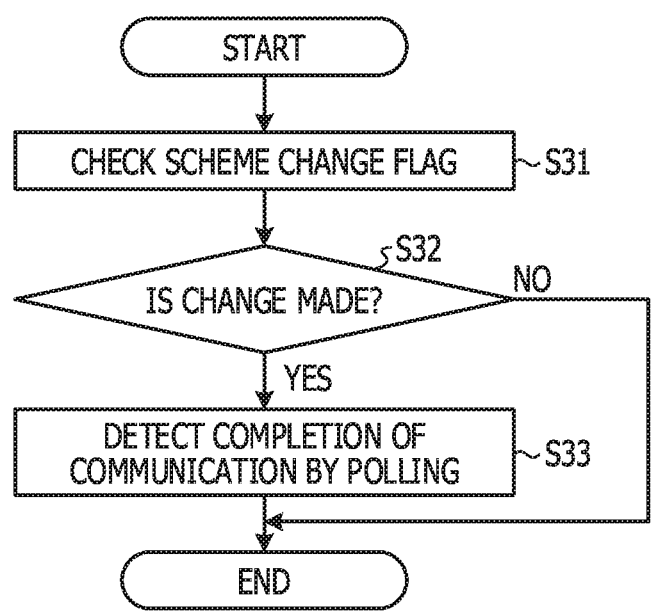
FIG. 9 is a flowchart of a communication completion waiting process.

Next, the flow of the process of waiting for the completion of the collective communication is described. FIG. 9 is a flowchart of the process of waiting for the completion of the collective communication. The process 3 executes the process of waiting for the completion of the collective communication after the process 3 transmits a reaching notification for the collective communication and before the process 3 becomes a sleep state.

As illustrated in FIG. 9, the completion waiting unit 33 checks the scheme change flag (in step S31) and determines whether or not the communication completion waiting scheme was changed (in step S32). If the communication completion waiting scheme is not changed as a result of step S32, the process is terminated and the completion waiting unit 33 waits for the completion of the communication by the interruption scheme without changing the communication completion waiting scheme. If the communication completion waiting scheme is changed, the completion waiting unit 33 detects the completion of the communication by polling (in step S33).

If the communication completion waiting scheme is changed, the process 3 may suppress a delay of the collective communication by causing the completion waiting unit 33 to detect the completion of the communication by polling.

As described above, in the embodiment, the determining unit 32a measures a time period from the time when the process 3 starts the collective communication to the time when the process 3 receives a reaching notification, and the determining unit 32a determines whether or not the measured time period is equal to or shorter than the predetermined threshold. If the determining unit 32a determines that the measured time period is equal to or shorter than the predetermined threshold, the target determining unit 32b identifies a process 3 that is to be changed and for which the communication completion waiting scheme is to be changed to the polling scheme. Then, the instruction transmitting unit 32c transmits, to the process 3 identified by the target determining unit 32b, an instruction to change the communication completion waiting scheme to the polling scheme. Thus, the process 3 of which the start of the collective communication is delayed may suppress a delay of a part, affected by the delay of the start, of processes 3.

In the embodiment, since an instruction to change the scheme of waiting for the completion of the collective communication is provided by RDMA, the scheme change flag may be set in a memory 13 of a different PC server 1. However, a change of the communication completion waiting scheme may be late, depending on an instruction by RDMA.

For example, in the example illustrated in FIG. 1, since the change instruction is provided before the transmission of the reaching notification from the process #2 to the process #0, the process #2 may change the communication completion waiting scheme before becoming the sleep state. However, if the change instruction is provided after the process #2 transmits the reaching notification to the process #0 and becomes the sleep state, the process #2 is in the sleep state and thus does not change the communication completion waiting scheme.

In order to avoid the aforementioned problem caused by the timing, the process 3 may provide an instruction to change the collective communication completion waiting scheme by interruption, instead of providing the instruction to change collective communication completion waiting scheme by RDMA. By providing the instruction to change the collective communication completion waiting scheme by interruption, the process 3 in the sleep state may change the communication completion waiting scheme to the polling scheme.

The embodiment describes the case where the communication algorithm is the dissemination algorithm. The communication algorithm, however, may be another algorithm such as a binomial tree algorithm, Bruck's algorithm, or a recursive doubling algorithm.

Figure 10:
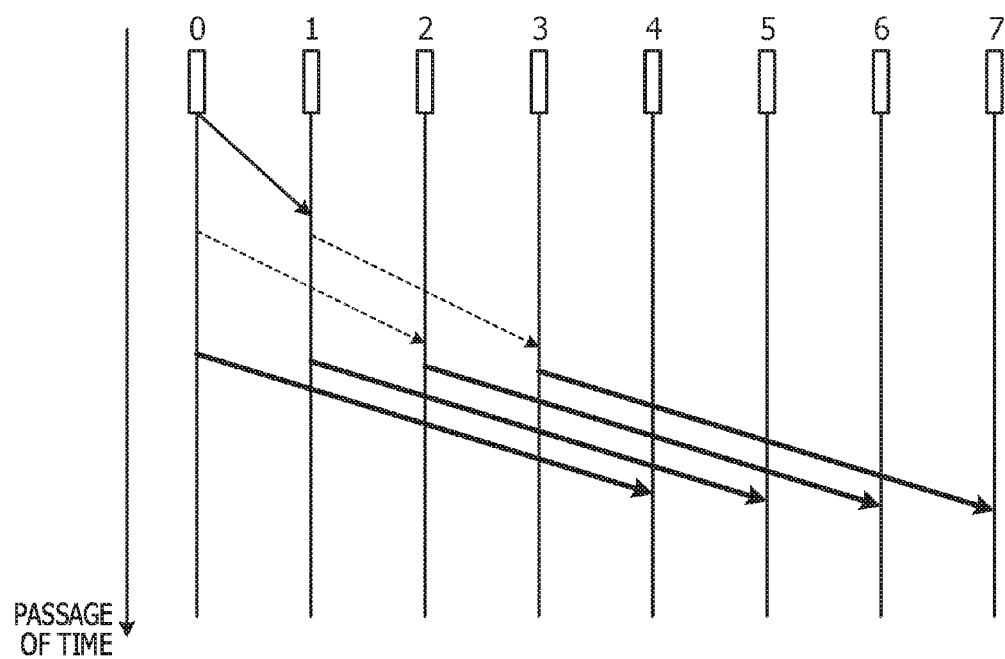
FIG. 10 is a diagram describing a binomial tree algorithm.

FIG. 10 is a diagram describing the binomial tree algorithm. The binomial tree algorithm is used within an operation such as Broadcast operation. The Broadcast operation is an operation to distribute data held by a certain process to all other processes participating in the Broadcast operation. The binomial tree algorithm is executed in a number log(n) of steps if the number of processes is n.

For example, as illustrated in FIG. 10, 8 processes #0 to #7 are executed, and the Broadcast operation is used to distribute data held by the process #0 to the processes #1 to #7. In a case where the number of the processes is 8, the data is distributed in log(8)=3 steps.

In the first step, the data is transmitted from the process #0 to the process #1.

In the second step, the data is transmitted from the process #0 to the process #2 and transmitted from the process #1 to the process #3.

In the third step, the data is transmitted from the process #0 to the process #4, transmitted from the process #1 to the process #5, transmitted from the process #2 to the process #6, and transmitted from the process #3 to the process #7.

In the case where the binomial tree algorithm is executed, the destination to which the reaching notification is transmitted in step S24 illustrated in FIG. 8 is calculated based on a formula of (((the rank number of the process 3)+$2^{(i-1)}$) % n). For example, the destinations of the data are calculated as follows.

The process #0 transmits the data to the process #1 in the first step based on the fact that $(0+2^{(1-1)})=1$.

The process #0 transmits the data to the process #2 in the second step based on the fact that $(0+2^{(2-1)})=2$.

The process #0 transmits the data to the process #4 in the third step based on the fact that $(0+2^{(3-1)})=4$.

The process #1 transmits the data to the process #3 in the second step based on the fact that $(1+2^{(2-1)})=3$.

Figure 11:
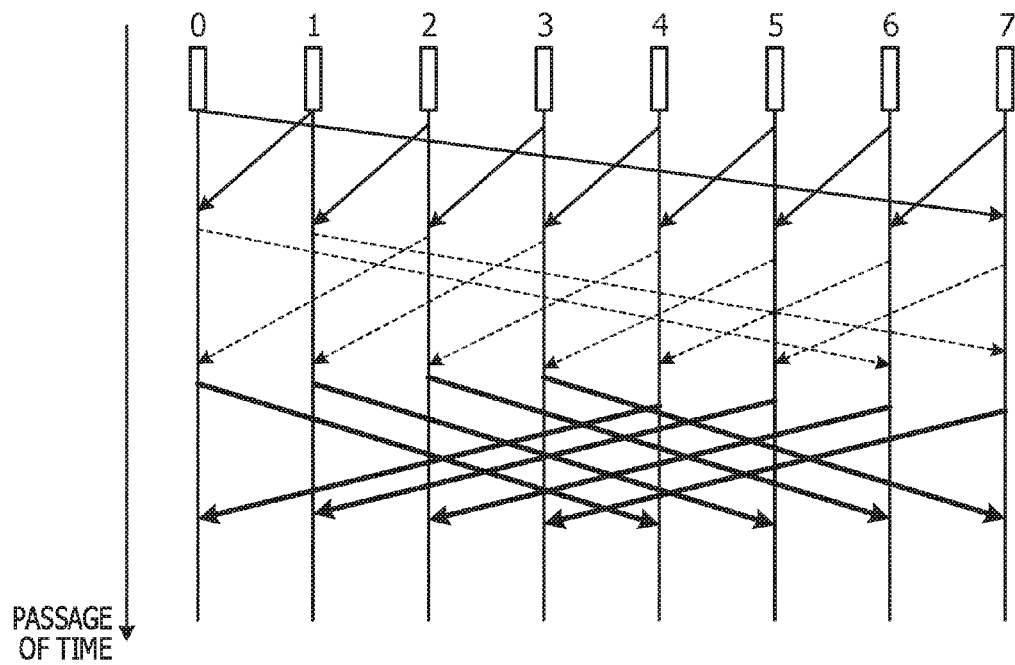
FIG. 11 is a diagram describing Bruck's algorithm.

FIG. 11 is a diagram describing Bruck's algorithm. Bruck's algorithm is used within an operation such as MPI_Alltoall or MPI_Allgather, for example. If the number of processes is n, Bruck's algorithm is executed in a number log(n) of steps. For example, as illustrated in FIG. 11, if the number of processes is 8, Bruck's algorithm is executed in log(8)=3 steps.

In the first step, the process #0 transmits data to the process #7, the process #1 transmits data to the process #0, the process #2 transmits data to the process #1, the process #3 transmits data to the process #2, the process #4 transmits data to the process #3, the process #5 transmits data to the process #4, the process #6 transmits data to the process #5, and the process #7 transmits data to the process #6.

In the second step, the process #0 transmits the data to the process #6, the process #1 transmits the data to the process #7, the process #2 transmits the data to the process #0, the process #3 transmits the data to the process #1, the process #4 transmits the data to the process #2, the process #5 transmits the data to the process #3, the process #6 transmits the data to the process #4, and the process #7 transmits the data to the process #5.

In the third step, the process #0 transmits the data to the process #4, the process #1 transmits the data to the process #5, the process #2 transmits the data to the process #6, the process #3 transmits the data to the process #7, the process #4 transmits the data to the process #0, the process #5 transmits the data to the process #1, the process #6 transmits the data to the process #2, and the process #7 transmits the data to the process #3.

In the case where Bruck's algorithm is executed, the destination to which the reaching notification is transmitted in step S24 illustrated in FIG. 8 is calculated based on a formula of (((the rank number of the process 3)−$2^{(i-1)}$) % n).

Figure 12:
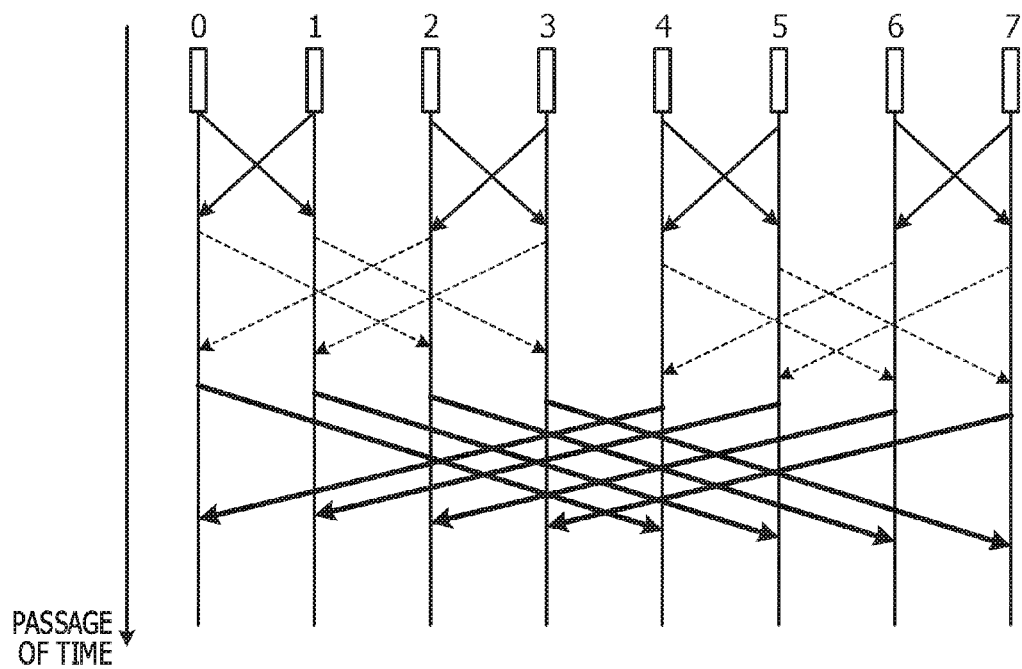
FIG. 12 is a diagram describing a recursive doubling algorithm.

FIG. 12 is a diagram describing the recursive doubling algorithm. The recursive doubling algorithm is used within an operation such as MPI_Alltoall or MPI_Allgather, for example. If the number of processes is n, the recursive doubling algorithm is executed in a number log(n) of steps.

For example, as illustrated in FIG. 12, if the number of processes is 8, the recursive doubling algorithm is executed in log(8)=3 steps.

In the first step, data is exchanged between the processes #0 and #1 (the process #0 transmits data to the process #1 and the process #1 transmits data to the process #0), data is exchanged between the processes #2 and #3 (the process #2 transmits data to the process #3 and the process #3 transmits data to the process #2), data is exchanged between the processes #4 and #5 (the process #4 transmits data to the process #5 and the process #5 transmits data to the process #4), and data is exchanged between the processes #6 and #7 (the process #6 transmits data to the process #7 and the process #7 transmits data to the process #6).

In the second step, the data is exchanged between the processes #0 and #2, the data is exchanged between the processes #1 and #3, the data is exchanged between the processes #4 and #6, and the data is exchanged between the processes #5 and #7.

In the third step, the data is exchanged between the processes #0 and #4, the data is exchanged between the processes #1 and #5, the data is exchanged between the processes #2 and #6, and the data is exchanged between the processes #3 and #7.

In the case where the recursive doubling algorithm is executed, the destination to which the reaching notification is transmitted in step S24 illustrated in FIG. 8 is calculated based on a formula of (((the rank number of the process 3)+$2^{\wedge}$ (i−1)) % ($2^{\wedge}$ i)+($2^{\wedge}$ i)*[(the number of the process 3)/($2^{\wedge}$ i)]). In this case, a symbol * indicates multiplication, and [y] indicates the maximum integer that does not exceed y.

In the first step, a process #p (p is in a range of 0 to 7) transmits data to a process with a rank number of (p+$2^{\wedge}$ (1−1) % ($2^{\wedge}$ 1)+($2^{\wedge}$ 1)*[p/($2^{\wedge}$ 1)]).

In the second step, the process #p (p is in a range of 0 to 7) transmits data to a process with a rank number of (p+$2^{\wedge}$ (2−1) % ($2^{\wedge}$ 2)+($2^{\wedge}$ 2)*[p/($2^{\wedge}$ 2)]).

In the third step, the process #p (p is in a range of 0 to 7) transmits data to a process with a rank number of (p+$2^{\wedge}$ (3−1) % ($2^{\wedge}$ 3)+($2^{\wedge}$ 3)*[p/($2^{\wedge}$ 3)]).

Even if the communication algorithm is not the dissemination algorithm, the embodiment is applicable to the communication algorithms other than the dissemination algorithm.

Although the embodiment describes the PC cluster system, the embodiment is not limited to this. The embodiment is applicable to other parallel computing systems. In addition, although the embodiment describes the case where each of the processes of the parallel program is executed by a respective CPU 12, each CPU 12 may have multiple cores, each of the processes may be executed by a respective core, and multiple processes may be executed by each CPU 12.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A system comprising:
a plurality of arithmetic devices configured to execute arithmetic processes in parallel,
wherein each of plurality of arithmetic devices comprises:
a memory; and
at least one processor, coupled to the memory, configured to:
determine whether a time period from a start of collective communication to reception from another arithmetic device involved in the collective communication is equal to or shorter than a predetermined threshold,
determine a target arithmetic device that is among the plurality of arithmetic devices and for which a waiting scheme involved in the collective communication is to be changed when the time period is determined to be equal to or shorter than the predetermined threshold, and
transmit using remote direct memory access (RDMA), to the target arithmetic device, an instruction to change the waiting scheme involved in the collective communication.

2. The system according to claim 1, wherein
the waiting scheme involved in the collective communication includes at least an interruption scheme and a polling scheme, and
the change instruction is an instruction to change the waiting scheme involved in the collective communication from the interruption scheme to the polling scheme.

3. The system according to claim 1, wherein
the at least one processor is further configured to determine the target arithmetic device based on an algorithm for the collective communication.

4. The system according to claim 3, wherein
when the algorithm is a dissemination algorithm, identification numbers that identify the arithmetic devices are in a range of 0 to n−1, and an identification number of the determining arithmetic device that is among the identification numbers in the range of 0 to n−1 is p, an identification number of the target arithmetic device in an i-th step of the collective communication is calculated based on a formula of $((p+2^{(i-1)}) \% n)$,
wherein n is a positive integer, p is zero or a positive integer, and i is a positive integer.

5. The system according to claim 1, further comprising:
a switch coupled to the plurality of arithmetic devices.

6. A method executed by an arithmetic device being configured to execute arithmetic processes in parallel with one or more other arithmetic devices, the method comprising:
determining whether a time period from a start of collective communication to reception from at least one of the one or more other arithmetic devices involved in the collective communication is equal to or shorter than a predetermined threshold;
determining a target arithmetic device that is among the one or more other arithmetic devices and for which a waiting scheme involved in the collective communication is to be changed when the time period is determined to be equal to or shorter than the predetermined threshold; and
transmitting using remote direct memory access (RDMA), to the target arithmetic device, an instruction to change the waiting scheme involved in the collective communication.

7. The method according to claim 6, wherein
the waiting scheme involved in the collective communication includes at least an interruption scheme and a polling scheme, and
the change instruction is an instruction to change the waiting scheme involved in the collective communication from the interruption scheme to the polling scheme.

8. The method according to claim 6, wherein
the determining of the target arithmetic device determines the target arithmetic device based on an algorithm for the collective communication.

9. The method according to claim 8, wherein
when the algorithm is a dissemination algorithm, identification numbers that identify the arithmetic devices are in a range of 0 to n−1, and an identification number of the determining arithmetic device that is among the identification numbers in the range of 0 to n−1 is p, an identification number of the target arithmetic device in an i-th step of the collective communication is calculated based on a formula of $((p+2^{(i-1)}) \% n)$,
wherein n is a positive integer, p is zero or a positive integer, and i is a positive integer.

10. The method according to claim 6, wherein
the arithmetic device is coupled to the one or more other arithmetic device via a switch.

11. A non-transitory storage medium storing a program for causing an arithmetic device to execute a process, the arithmetic device being configured to execute arithmetic processes in parallel with one or more other arithmetic devices, the process comprising:
determining whether a time period from a start of collective communication to reception from at least one of the one or more other arithmetic devices involved in the collective communication is equal to or shorter than a predetermined threshold;
determining a target arithmetic device that is among the one or more other arithmetic devices and for which a waiting scheme involved in the collective communication is to be changed when the time period is determined to be equal to or shorter than the predetermined threshold; and
transmitting using remote direct memory access (RDMA), to the target arithmetic device, an instruction to change the waiting scheme involved in the collective communication.

12. The storage medium according to claim 11, wherein
the waiting scheme involved in the collective communication includes at least an interruption scheme and a polling scheme, and
the change instruction is an instruction to change the waiting scheme involved in the collective communication from the interruption scheme to the polling scheme.

13. The storage medium according to claim 11, wherein
the determining of the target arithmetic device determines the target arithmetic device based on an algorithm for the collective communication.

14. The storage medium according to claim 13, wherein
when the algorithm is a dissemination algorithm, identification numbers that identify the arithmetic devices are in a range of 0 to n−1, and an identification number of the determining arithmetic device that is among the identification numbers in the range of 0 to n−1 is p, an identification number of the target arithmetic device in an i-th step of the collective communication is calculated based on a formula of $((p+2^{(i-1)}) \% n)$, wherein n is a positive integer, p is zero or a positive integer, and i is a positive integer.

15. The storage medium according to claim 11, wherein the arithmetic device is coupled to the one or more other arithmetic device via a switch.

\* \* \* \* \*